Nov. 4, 1930.  A. B. CHRISTY  1,780,578
CONTROL MECHANISM FOR GRAIN CAR UNLOADING APPARATUS
Filed March 23, 1929   2 Sheets-Sheet 2
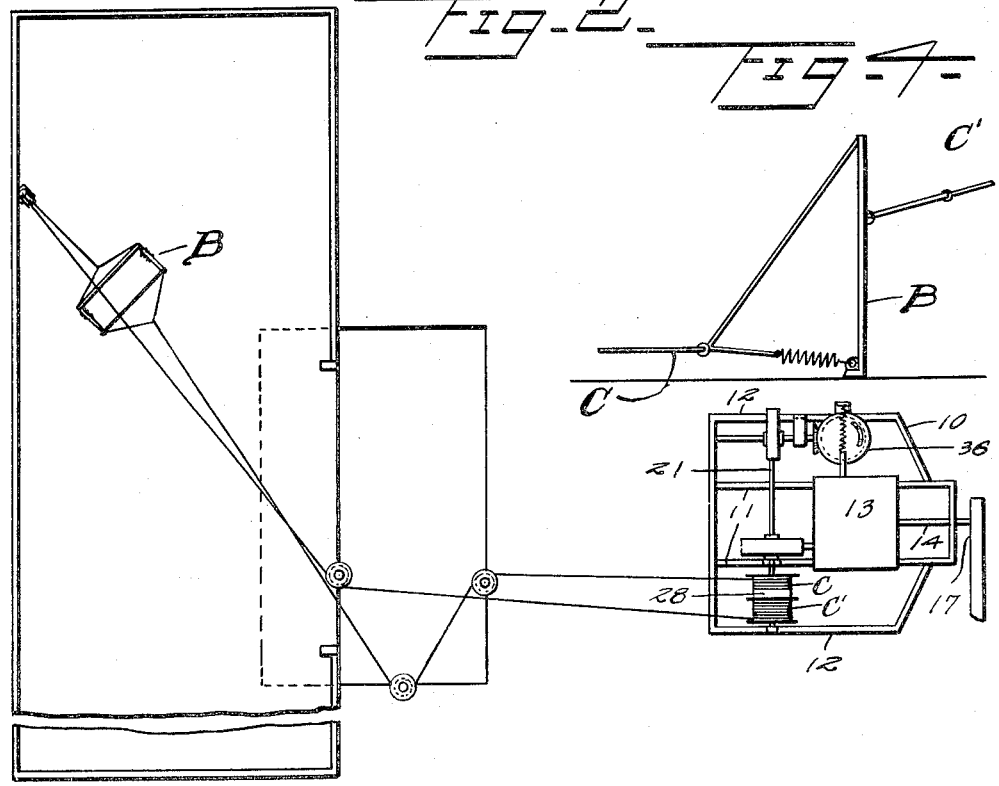
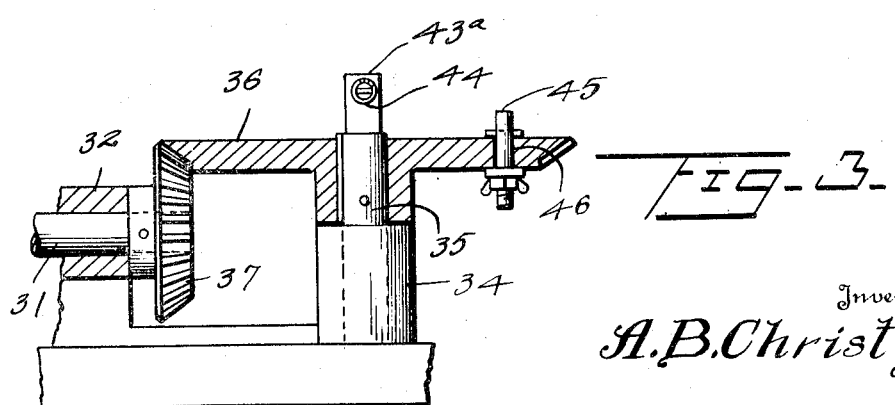
Inventor
A. B. Christy
By Watson E. Coleman
Attorney Patented Nov. 4, 1930

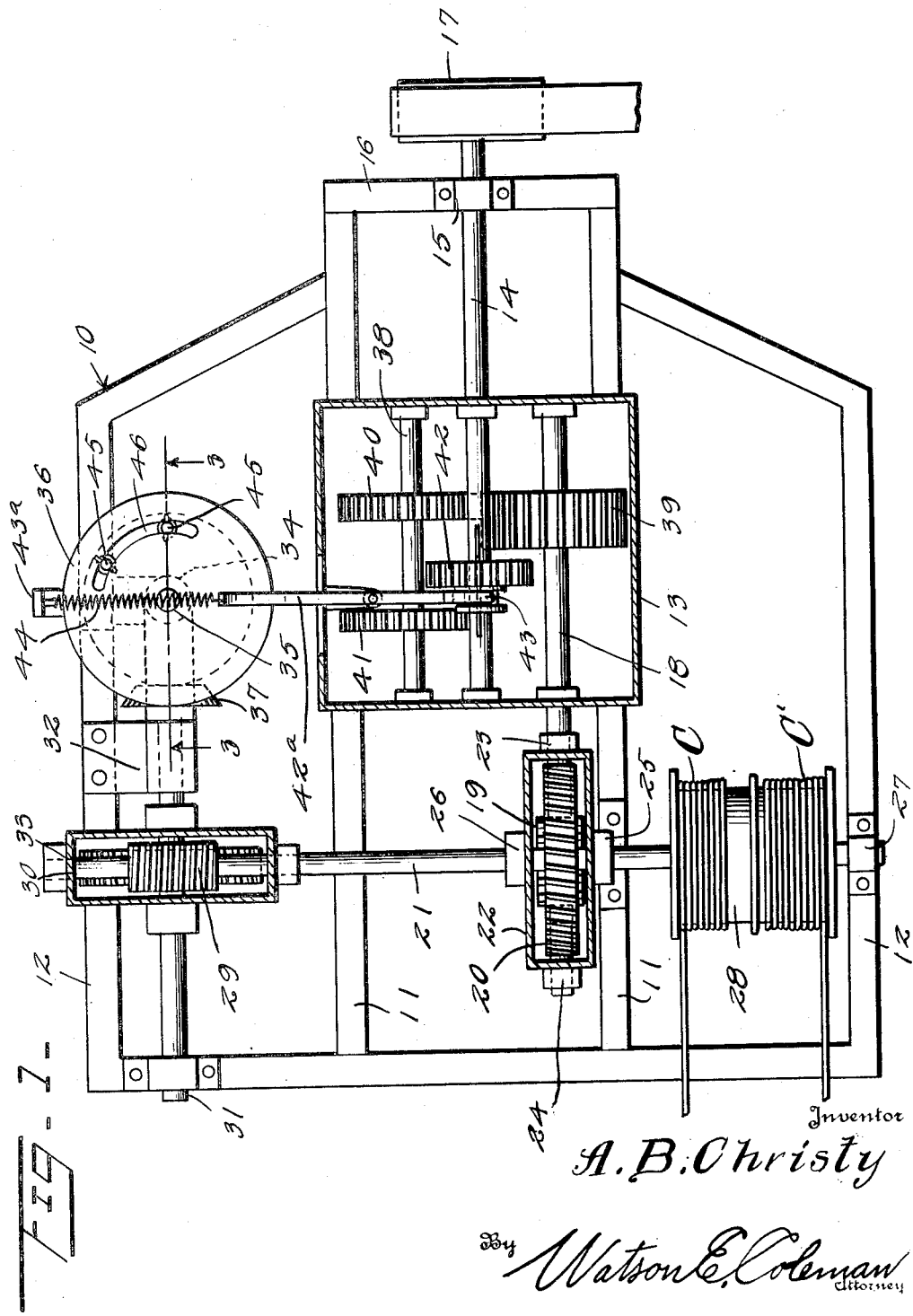

1,780,578

UNITED STATES PATENT OFFICE

ARLEY B. CHRISTY, OF LIBERAL, KANSAS, ASSIGNOR OF ONE-THIRD TO THE LIGHT GRAIN & MILLING COMPANY, A COPARTNERSHIP CONSISTING OF C. M. LIGHT, MRS. C. M. LIGHT, I. R. SALLEY, AND PAUL W. LIGHT, OF LIBERAL, KANSAS, AND ONE-THIRD TO WILFRED E. BUSH, OF LIBERAL, KANSAS.

CONTROL MECHANISM FOR GRAIN-CAR-UNLOADING APPARATUS

Application filed March 23, 1929. Serial No. 349,466.

This invention relates to control mechanism for grain car unloading apparatus, and more particularly to an operating mechanism for use with the drag bucket type of unloading apparatus.

As is well known to those familiar with the art, in the drag bucket type of grain car unloading apparatus, the car is placed over a pit into which the grain is to be discharged and the drag bucket is caused to travel from the open door of the car to the ends thereof, gathering a load of grain as it moves and discharging this load of grain through the open door. These buckets are controlled by cables operated from a suitable power drum, and an important object of this invention is to provide means for automatically reversing the operation of the cable at a predetermined point.

A further object of the invention is to produce a device of this character which may be very readily and cheaply manufactured and which will be durable and efficient in service.

These and other objects I attain by the construction shown in the accompanying drawings, wherein for the purpose of illustration is shown a preferred embodiment of my invention and wherein:—

Figure 1 is a plan view partially in section of a control unit for grain car unloading devices constructed in accordance with my invention;

Figure 2 is a semi-diagrammatic view showing the manner of connecting the unit with the drag;

Figure 3 is a detail sectional view on the line 3—3 of Figure 1;

Figure 4 is a detail view of the drag.

Referring now more particularly to the drawings, the numeral 10 generally designates a supporting frame including central and outer parallel frame elements 11 and 12 suitably secured to one another. The inner frame elements have mounted thereon at the approximate center thereof a gear casing 13 through one end wall of which an input or drive shaft 14 extends. This shaft further extends through a bearing 15 carried by a cross member 16 connecting the inner frame members and the shaft is connected in any suitable manner, as by a belt and pulley gearing, indicated at 17, to a suitable power plant (not herein shown). Through the opposite end of the casing, the driven or output shaft 18 is extended, and this shaft has secured thereto a worm 19 engaging a worm gear 20 carried by a transversely extending shaft 21.

The gear 20 and worm 19 are enclosed in a suitable housing 22 secured to the frame, and this housing affords bearings 23 and 24 for the output shaft and bearings 25 and 26 for the transverse shaft 21. The transverse shaft 21 has one end thereof mounted in a bearing 27 carried by one of the outer frame members and between this shaft and housing 22 has secured thereto a drum 28. The opposite end of the transverse shaft 21 is provided with a worm 29 meshing with a worm gear 30 carried by a shaft 31 mounted in a bearing 32 upon the other of the side members 12. The worm 29 and gear 30 are enclosed in a casing 33 similar to the housing 22. The bearing 32 has an extension 34 forming a mounting for a vertically directed shaft 35 having secured thereto a bevel gear 36 meshing with a bevel pinion 37 carried by the shaft 31.

The casing 13 houses reverse gearing and in addition to the input and output shafts 14 and 18 mounts a pony shaft 38 paralleling these shafts. The shaft 18 has secured thereto a relatively wide gear 39. The pony shaft 38 has secured thereto a gear 40 meshing with the gear 39 and a second gear 41 spaced longitudinally of the shaft from the gear 40. The input shaft 14 has splined thereto a gear 42 which may be meshed either with the gear 39 or with the gear 41, thus providing for a reverse operation of the output shaft. The gears 39, 40 and 41 are of the same size, so that speed of rotation of the shaft 18 is the same without regard to its direction of rotation. It will be obvious that with this transmission in operation, the gear 36 will be driven.

A shifting lever 42ᵃ for the gear 42 is provided and has at its inner end a fork 43 engaging the gear 42. The outer end of this lever overlies the upper surface of the gear 36 and is connected to a bracket 43ᵃ carried by the extension 34 by a spring 44 which is constantly under compression. At the point at which the spring 44 abuts the bracket 43a, the outer end of the lever and the pivot of the lever align with one another when the gear 42 is in its neutral position, and it will be obvious that when this lever is at either side of this neutral point, the spring will exert pressure to force the lever to a fully shifted position.

Carried by the gear 36 is an abutment at present shown as comprising spaced pins 45. As the gear 36 is rotated, one or the other of the ends of this abutment which, in the present instance, comprises the pins, will engage the outer end of the lever 42a, moving the lever toward its neutral position. It will, of course, be understood that mere disengagement of the gear 42 from one of the gears 41 or 39 will not actually check rotation of the output shaft, for the inertia of the apparatus will cause the slight additional movement necessary to move the end of the lever beyond the central line connecting the pivot thereof with the seat of the spring 44 upon the bracket 43a and thus permit this spring to act to complete the shifting action of the lever. The gear 36 may be circumferentially slotted, as at 46, or otherwise adapted to permit adjustment of these pins, so that the desired rotation of the shaft 21 and drum 28 can be obtained.

The usual feed and return cables C, C' are secured to the drum and oppositely wound thereon with the result that during rotation of the shaft in opposite directions, the cables will be oppositely moved and thus accomplish movement of the unloading bucket B in opposite directions.

Since the construction hereinbefore set forth is capable of a certain range of change and modification without materially departing from the spirit of the invention, I do not limit myself thereto except as hereinafter claimed.

I claim:—

An automatic operating and control device for an unloading mechanism of the character described, comprising a drum shaft for operating an unloading device, means connected to the drum shaft and controllable for turning the shaft in opposite directions and including a pivoted control lever, a rotary gear having an arcuate slot therein, a pair of pins adjustably secured in the slot, a driving connection between said gear and said shaft, said lever having one end disposed in the path of said pins, a bracket disposed upon the opposite side of said gear from the lever, and a compression spring interposed between the first mentioned end of the lever and said bracket.

In testimony whereof I hereunto affix my signature.

ARLEY B. CHRISTY.